(12) United States Patent
Bourdeaut

(10) Patent No.: US 8,325,619 B2
(45) Date of Patent: Dec. 4, 2012

(54) PROCESSING DEVICE FOR THE TRANSMISSION OF MEASUREMENTS TAKEN BY RADIO TERMINALS

(75) Inventor: Stanislas Bourdeaut, Velizy (FR)

(73) Assignee: Alcatel Lucent, Paris (FR)

( * ) Notice: Subject to any disclaimer, the term of this patent is extended or adjusted under 35 U.S.C. 154(b) by 312 days.

(21) Appl. No.: 12/377,646

(22) PCT Filed: Jul. 20, 2007

(86) PCT No.: PCT/EP2007/057546
§ 371 (c)(1),
(2), (4) Date: Jul. 23, 2010

(87) PCT Pub. No.: WO2008/019924
PCT Pub. Date: Feb. 21, 2008

(65) Prior Publication Data
US 2010/0284286 A1    Nov. 11, 2010

(30) Foreign Application Priority Data

Aug. 17, 2006  (FR) .................................... 06 53387
Oct. 25, 2006  (FR) .................................... 06 54505

(51) Int. Cl.
*H04L 12/26* (2006.01)
(52) U.S. Cl. .......... 370/252; 370/329; 370/468; 455/69; 455/452.2
(58) Field of Classification Search .................. 370/252, 370/253, 328–334, 338, 465, 468; 455/68, 455/69, 422.1, 434, 460–453, 509, 522
See application file for complete search history.

(56) References Cited

U.S. PATENT DOCUMENTS

| | | |
|---|---|---|
| 2002/0056132 A1 | 5/2002 | Wilson |
| 2003/0134655 A1 | 7/2003 | Chen et al. |
| 2005/0113099 A1 | 5/2005 | Eriksson et al. |
| 2006/0227888 A1* | 10/2006 | Khan .............................. 375/260 |
| 2007/0184865 A1* | 8/2007 | Phan et al. ..................... 455/509 |
| 2008/0070581 A1* | 3/2008 | Charbit et al. ................ 455/450 |
| 2008/0076359 A1* | 3/2008 | Charpentier et al. ........ 455/63.1 |
| 2009/0185533 A1* | 7/2009 | Kim et al. ...................... 370/329 |

FOREIGN PATENT DOCUMENTS

| | | |
|---|---|---|
| EP | 1 631 189 A1 | 3/2006 |
| GB | 2 382 002 A | 5/2003 |
| WO | WO 2005/060132 A1 | 6/2005 |

OTHER PUBLICATIONS

International Search Report, Apr. 10, 2007.

* cited by examiner

*Primary Examiner* — Pao Sinkantarakorn
(74) *Attorney, Agent, or Firm* — Fay Sharpe, LLP

(57) ABSTRACT

A processing device (D) acts on behalf of at least one radio terminal (UE) capable both of receiving data broadcast by a radio communication network in point-to-multipoint mode over a physical broadcast channel and according to an adaptable modulation and coding scheme, and of determining measurements representative of the radio conditions present in at least the cell in which it is located. This device (D) comprises processing means (PM) tasked with i) determining whether a measurement taken by at least one radio terminal (UE) corresponds to a status from among a set of predefined statuses, and ii) if so, to generate a message dedicated to the determined status and order the radio terminal (UE) to transmit this status message to the radio network within a portion of the time/frequency/code domain reserved within a signaling frame, for at least the cell in question.

39 Claims, 3 Drawing Sheets

PROCESSING DEVICE FOR THE TRANSMISSION OF MEASUREMENTS TAKEN BY RADIO TERMINALS

Figure 1:
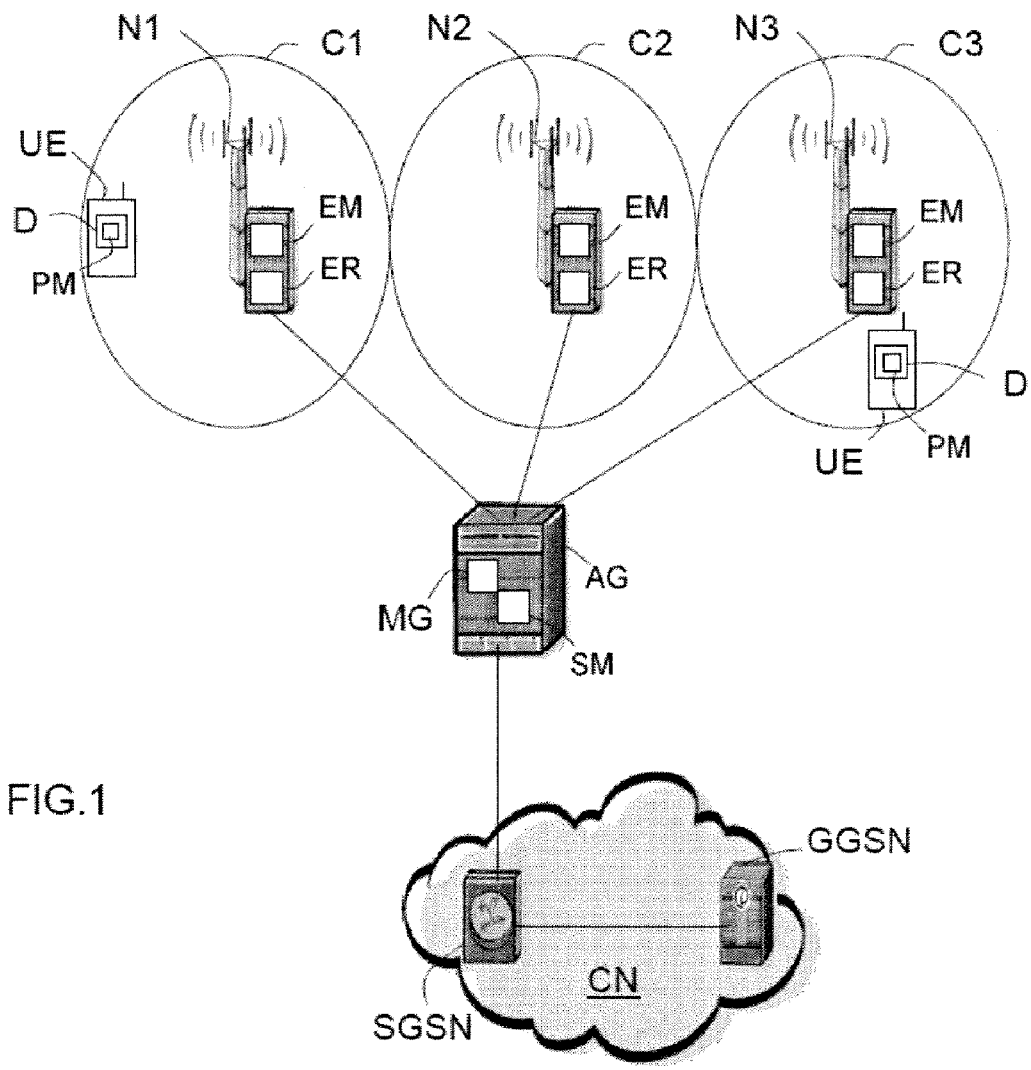

The invention pertains to radio communication networks capable of broadcasting data to radio communication terminals, in wave form over a so-called forward channel, by means of a carrier dedicated to a broadcast service.

Here, "radio communication network" refers to any type of network having access to a radio access network capable of broadcasting data. In particular, it may be a satellite network, such as an SDMB network (for "Satellite Digital Multimedia Broadcast"), or a terrestrial radio network, such as a UMTS network capable of broadcasting (for example, an MBMS (for "Multimedia Broadcast/Multicast Services") network), or its evolution known as LTE ("Long Term Evolution"), or GPRS, or DVB-H (for "Digital Video Broadcasting—Handheld"—used for mobile television), or a hybrid network, i.e. one which is both satellite-based and terrestrial.

Furthermore, the term "forward channel" here refers to the channel used to broadcast data from the network to radio (communication) terminals (also called a "downlink" when speaking of a terrestrial network), and the term "backward channel" refers to the channel that allows radio terminals to transmit data to the network (also called an "uplink" when speaking of a terrestrial network).

Furthermore, the term "radio communication terminal" here refers to any fixed or mobile (or portable, or cellular) communication device capable of exchanging data in wave form with another device, via a radio access network. Consequently, it may, for example, be a fixed or mobile (or cellular) telephone, a desktop or portable computer, or a personal digital assistant (or PDA), so long as it is equipped with radio communication means, which may potentially be satellite-based, that are capable of receiving broadcast data.

Additionally, the term "broadcast service" here refers to any unidirectional point-to-multipoint ("multicast" or "broadcast") or point-to-point (or "unicast") multimedia content broadcast service, and particularly the MBMS broadcast service, the SDMB broadcast service, the DVB-H broadcast service, including its variant adapted to satellite-based networks, and the broadcast services proposed in the evolution of UMTS known as LTE ("Long Term Evolution") and in the GSM/GPRS (MBMS/GPRS) or WBCDMA networks. As a reminder, the MBMS broadcast service is defined in the sixth version of the 3GPP (3rd Generation Partnership Project) specifications, which governs the transmission of multimedia data in mobile (or cellular) networks, such as UMTS or EDGE networks, and in particular in the 3GPP technical specifications TS 25.346 and 23.246 (which are accessible on the 3GPP website at the address "ftp.3gpp.org").

Finally, the term "multimedia content" here refers to data files, voice, audio files, or videos, in particular.

As is known to a person skilled in the art, in some of the aforementioned types of networks, and particularly in the LTE evolution of UMTS, it is possible to adapt, within the radio access network (or RAN), depending on the radio conditions, the modulating and coding scheme(s) to be applied to the data that must be broadcast to certain radio terminals on the forward channel, by means of a dedicated carrier (for example, the MBMS carrier).

This adaptation may, for example, be done based on measurement reports transmitted by the radio terminals on the backward channel. For example, the radio terminals are configured to transmit the measurement of the block error rate (or BLER), which represents the percentage of data blocks lost (i.e. not received) compared to the data blocks transmitted by the network on the forward channel's broadcast channel. The radio terminals may also transmit radio reception channel quality indicators, or CQIs, based, for example, on signal-to-noise ratio ($Ec/N_0$), RSCP ("Received Signal Channel Power"—power received over the allocated physical channel), RSSI ("Received Signal Strength Indicator"—all of the energy of the signal received over the entire band), or pathloss, or the bit error rate (or BER). It should be noted that a CQI indicator may also indicate a modulation and coding scheme that is preferred by a mobile terminal (under certain radio propagation conditions). As a reminder, the values of the CQI indicators are used by the network to adapt the reception and/or transmission parts of the radio terminals' communication modules, as well as the reception and/or transmission channels of its radio access network (the invention particularly applies to adapting the radio access network's transmission channel).

When content is broadcast over the forward channel in point-to-point mode, the radio terminal in question may transmit its own measurements to the network, over the backward channel. Indeed, it may use the point-to-point, bidirectional bearer that was specially established for it by the network, for broadcasting content, in order to send its measurements in the form of signaling data.

However, this reporting of measurements is not possible when the terminal has no established point-to-point bearer. This is particularly true when content is broadcast over the forward channel in point-to-multipoint mode, because the point-to-multipoint bearer is monodirectional. However, the use of a point-to-multipoint bearer for broadcasting content has real benefits, particularly in terms of bandwidth, so long as this content must be broadcast simultaneously to multiple radio terminals installed within at least one cell.

Naturally, the network may use information such as acknowledgement reports or negative-acknowledgement reports (or "Ack/Nack") in order to adapt the modulation and coding scheme(s) to be applied to the data to be broadcast, but this information does not always reflect the real (or actual) radio conditions within the radio access network. Indeed, a radio terminal may, for example, fail to receive several blocks of broadcast data while it is taking inter-technology radio access measurements (or "inter-RAT"), even when broadcast radio conditions are good.

The purpose of the invention is therefore to improve the situation.

To that end, it discloses a first processing device, intended to operate for at least one radio (communication) terminal capable both of receiving data broadcast by a radio (communication) network in point-to-multipoint mode, over a physical broadcast channel and according to an adaptable modulation and encoding scheme, and of determining measurements representative of the radio conditions that are present in at least the cell in which it is located.

This first processing device is characterized by the fact that it is intended to be installed in (or coupled to) a terminal, and that it comprises processing means tasked with generating a status message comprising data representative of the value of at least one measurement taken by the terminal, and with ordering this terminal to transport this status message over an authorized random access channel (for example, a Random Access CHannel (or RACH) over GSM, GPRS, UTRAN or LTE) in order to transmit it to the radio network.

The length of the bit frame sent may be limited so that the status message can be decoded by the radio network's receiver even if it is emitted by the terminal asynchronously. This first device requests the allocation of sufficient radio resources to the authorized random access channel in order to avoid congestion when a large number of terminals simultaneously transmit a status message containing at least one measurement taken.

Advantageously, the radio network may draw upon known capture procedures for distinguishing between different messages when they are received roughly simultaneously.

The first device of the invention may comprise other characteristics, which may be taken separately or in combination, in particular:
- the authorized random access channel may be dedicated to reporting measurements. In this situation, it is different from the random access channel that is used by a terminal to issue its initial connection request;
- in one variant, the authorized random access channel may be multiplexed (time-, frequency-, or code-multiplexed) with the random access channel that is used by a terminal to issue its initial connection request;
  - its processing means may, when a single random access channel is used to report measurements and connection requests, be tasked with integrating data representative of the type of message into the message that must be reported by the terminal, said type being selected from among a measurement report and a connection request;
- the processing means may be tasked with determining whether a measurement taken by the radio terminal corresponds to a status among a set of predefined statuses, and if so, to generate a message dedicated to the determined status, and with ordering the radio terminal to transmit this status message, over the authorized random access channel, to the radio network in a portion of the time/frequency/code domain which is reserved for this status message, for at least the cell in question;
  - the processing means may be tasked with ordering the radio terminal located within a cell to multiplex the status message that it generated within the frequency domain in a sub-carrier dedicated to that purpose;
  - in one variant, the processing means may be tasked with ordering the radio terminal located within a cell to multiplex the status message that in generated within the time domain in a sub-frame which is dedicated to the determined status;
- the measurements may, for example, be radio reception channel quality indicators (or CQI);
  - each status may, for example, be associated with a predefined range of radio reception channel quality indicator values (or equivalent). If so, the processing means may be tasked with determining the range of values that a measurement belongs to, in order to determine the status that corresponds to this range of values.

The invention further discloses a second processing device which is characterized by the fact that it comprises processing means tasked both with determining whether a measurement taken by at least one radio terminal corresponds to a status among a set of predefined statuses, and if so, with generating a message dedicated to that status and ordering the (or every) radio terminal (that took this measurement) to transmit this status message to the radio network (in a synchronized fashion) in a portion of the time/frequency/code domain which is specifically reserved for it, within a signaling frame, for at least the cell in question.

It is important to note that the portion of the time/frequency/code domain is reserved here for reporting a status and not reserved for a single radio terminal. Rather, all of a cell's radio terminals which match a single status (at a given moment) use the same portion of the time/frequency/code domain to transmit their shared status. As a result, this second processing device makes it possible to bypass congestion problems when a large number of terminals transmit a status message indicating their status at the same time.

The second device of the invention may comprise other characteristics, which may be taken separately or in combination, in particular:
- its processing means may be tasked with ordering at least one radio terminal located within a cell to frequency-multiplex the status message that they generated within a sub-carrier dedicated to that purpose inside the signaling frame;
- In one variant, its processing means may be tasked with ordering at least one radio terminal located within a cell to frequency-multiplex the status message that they generated in a sub-frame which is dedicated to the status determined, inside the signaling frame;
- its processing means may be tasked with ordering at least one radio terminal located within a cell to multiplex the status message that they generated with a potential negative-acknowledgment report (or "Hack") or with a potential acknowledgment report (or "Ack");
- the measurements may, for example, be radio reception channel quality indicators (or CQI);
  - each status may, for example, be associated with a predefined range of radio reception channel quality indicator values (or equivalent). If so, the processing means may be tasked with determining the range of values that a measurement belongs to, in order to determine the status that corresponds to this range of values.

The invention further discloses a radio communication terminal of the aforementioned type, equipped with a first or second processing device of the same type as the one described hereinabove. Such a radio communication terminal may include other characteristics, which may be taken separately or in combination, in particular:
- it may comprise multiplexing means tasked with frequency-multiplexing a status message (generated by the second processing device) within a subcarrier dedicated to itself inside a signaling frame;
- in one variant, it may comprise multiplexing means tasked with time-multiplexing a status message (generated by the second processing device) within a sub-frame which is dedicated to the determined status (corresponding to the status message) inside the signaling frame;
- it may comprise pre-multiplexing means tasked with multiplexing the status message (generated by the second processing device) with a potential negative-acknowledgment report ("Nack") or with a potential acknowledgment report ("Ack").
  - these pre-multiplexing means may, for example, be tasked with multiplexing the status message (generated by the second processing device) with a potential negative-acknowledgment report or with a potential acknowledgment report by means of QPSK modulation;
- it may comprise measurement means tasked with taking measurements known as radio reception channel quality indicators (or CQIs);
  - the measurements may, for example, relate to the channel known as "MCH", "DL-SCH", "BCH", or "SCH", or to any other reference channel for one or more cells;

each status may, for example, be associated with a predefined range of radio reception channel quality indicator values.

The invention further discloses a network device for a radio communication network capable of broadcasting data within cells, in point-to-multipoint mode over a physical broadcast channel and in accordance with modulation and coding schemes that are adaptable based on said cells, and comprising management means tasked with adapting the schemes depending on actual radio broadcast conditions present within the cells.

This device is characterized by the fact that its management means are tasked with adapting the scheme depending on messages which are representative of predefined statuses corresponding to measurements taken by radio communication terminals located within at least one cell, and transmitted by these radio terminals within portions of the time/frequency/code domain which are respectively reserved for the messages representative of the statuses within (signaling) frames over the backward channel, for at least the cell in question.

This network device may have other characteristics, which may be taken separately or in combination, in particular:
  it may comprise signaling means tasked with notifying the radio terminals of the portions of the time/frequency/code domain which are reserved for status messages within (signaling) frames over the backward channel;
  it may receive from multiple radio terminals, within a single (restricted) time window, the same status message, over the same physical channel of the backward channel (this more particularly pertains to networks known as "SFN" for "Single Frequency Network"—in such a cases, this is made possible using OFDM, for "Orthogonal Frequency Division Multiplex", by inserting a "cyclic" prefix at the start of each frame);
  if status messages are received from at least one cell having an adaptable scheme, its management means may be tasked with determining the status message which represents the worst status, then adapting the scheme to at least that cell depending on this determined worst status;
  in one variant, if status messages are received from at least one cell having an adaptable scheme, its management means may be tasked with determining the status message which represents the best status, then adapting the scheme to at least that cell depending on this determined best status;
  in another variant, if status messages are received from at least one cell having an adaptable scheme, its management means may be tasked with determining a weighted average of the statuses that these status messages represent, then adapting the scheme to at least that cell depending on this weighted average;
  its management means may be tasked with determining the weighted average based on predefined weights associated with each of the predefined states;
  in one variant, its management means may be tasked with determining the weighted average based on the respective powers of the signals that contain the status messages, received by the radio access network of the radio network;
  in another variant, in the presence of status messages transmitted in frames spread out by means of scrambling codes specific to the radio terminals, and if status messages are received from at least one cell having an adaptable scheme, its management means may be tasked with determining the distribution within at least one cell of the statuses which are represented by the received status messages, then with adapting the scheme of at least one cell based on this status distribution;
  each scrambling code used by a radio terminal may, for example, be derived from a communication identifier of the radio terminal, and potentially from an identifier of the data broadcasting service;
  in one variant, the scrambling codes may possess orthogonality properties for distinguishing between spread-out frames transmitted by different radio terminals;
  it may form part of a radio access network of the radio communication network;
  it may constitute an access gateway enabling access to a core network of the radio network, or a base station of the radio network, or a base station of the radio network, or a broadcast server (MBMS, for example) of the radio network.

Figure 2:
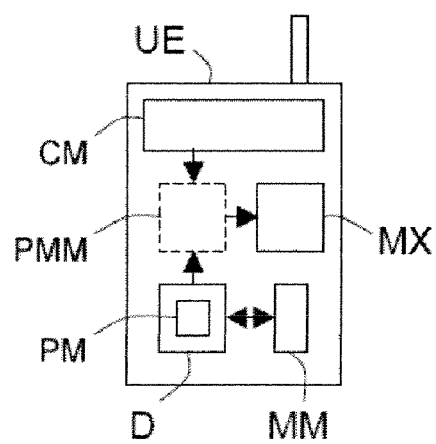
Figure 3:
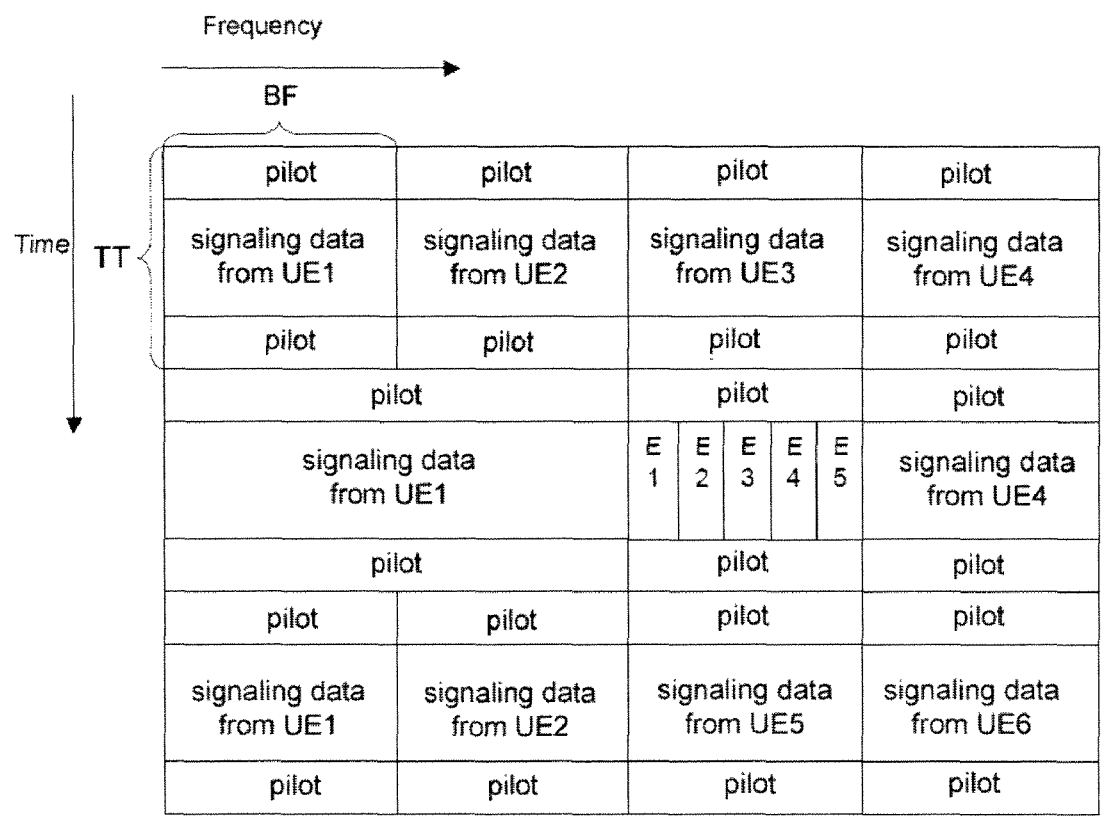
Figure 4:
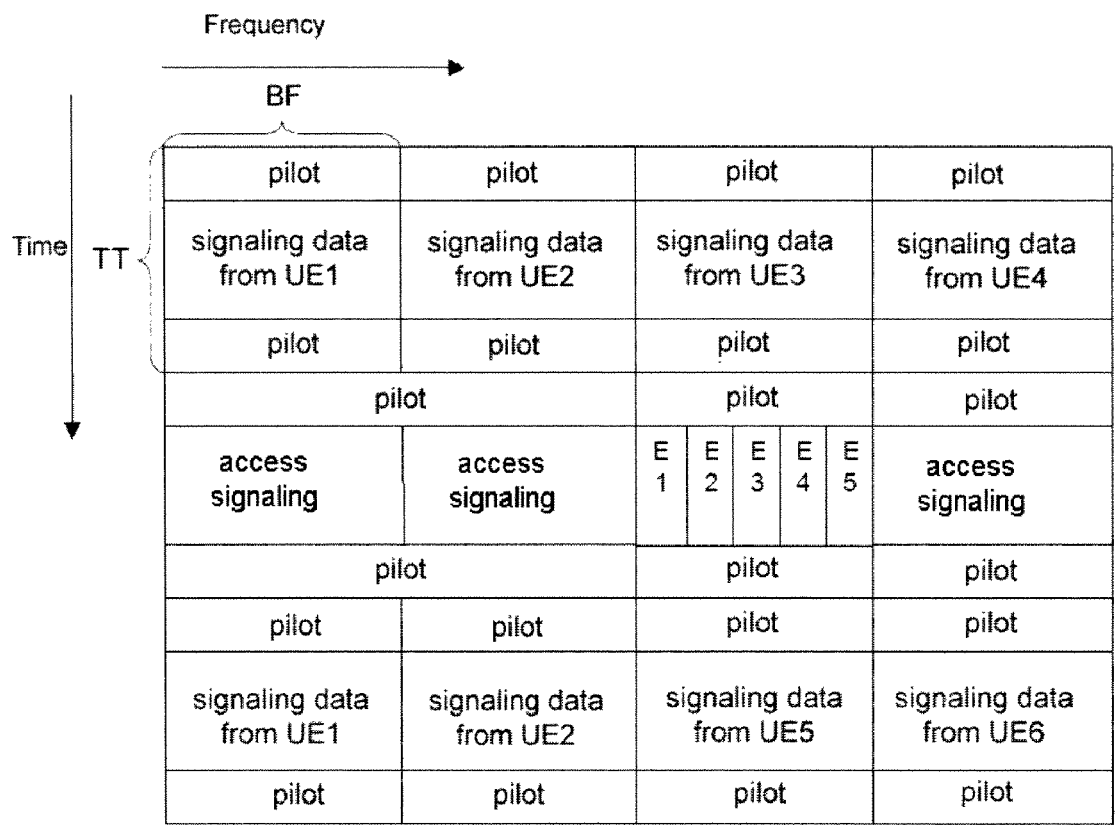

Other characteristics and benefits of the invention shall become apparent upon examining the detailed description below, and the attached drawings, in which:

FIG. 1 schematically and functionally depicts a part of a terrestrial broadcast network comprising an inventive access gateway to which mobile terminals equipped with an inventive processing device are connected, FIG. 2 schematically and functionally depicts an example embodiment of an inventive mobile terminal, FIG. 3 schematically depicts a first example breakdown of the time/frequency/code domain, incorporating a time/frequency portion dedicated to the transmission of statuses representative of radio reception channel quality indicators (or CQIs) in a situation known as "uplink-synchronous", and FIG. 4 schematically depicts a second example breakdown of the time/frequency/code domain, incorporating a time/frequency portion dedicated to the transmission of statuses representative of radio reception channel quality indicators (or CQIs) in a situation known as "uplink-asynchronous".

The attached drawings may serve not only to complete the invention, but also to contribute to its definition, if need be.

The object of the invention is to enable a radio access network of a radio communication network to know the actual (or real) radio propagation conditions over links established between the radio network and radio (communication) terminals, so that it can adapt the modulation and encoding scheme(s) to be applied to the data (potentially multimedia data) that must be broadcast in point-to-multipoint mode to these radio terminals over a physical broadcast channel, depending on these conditions.

In what follows, it is assumed by way of a non-limiting example that the communication terminals are mobile (or cellular) telephones. However, the invention is not limited to this type of radio terminal. Rather, it pertains to any fixed or mobile (or portable or cellular) communication device capable of exchanging data in wave form with another device, via a terrestrial and/or satellite-based radio access network. Consequently, they may also be land-line telephones, laptop or desktop computers, personal digital assistants (or PDAs), a fixed or portable television program radio reception device, such as a video player or portable television set, a fixed or portable device for receiving video or music programs, or a radio device installed on-board a vehicle (such as a car, truck, bus, train, ship, aircraft, or likewise).

Furthermore, it is assumed in what follows, by way of a non-limiting example, that the radio communication network is a terrestrial data (e.g. multimedia data) broadcast network. For example, the network is the evolution, known as LTE ("Long Term Evolution"), of a cellular (or mobile) UMTS/MBMS ("Multimedia Broadcast/Multicast Services") network. However, it may also be a UMTS/DVB-H network, particularly adapted to broadcasting mobile television (or "mobile TV") programs, for example.

It should be noted that the invention is not limited solely to terrestrial radio data broadcast networks. It generally pertains to all types of networks with a radio access network capable of broadcasting data, at least in point-to-multipoint bearers, and particularly satellite networks, such as SDMB ("Satellite Digital Multimedia Broadcast") networks, or hybrid networks (i.e. both satellite-based and terrestrial).

As is depicted in the sole figure, an LTE broadcast network may, schematically but nonetheless sufficiently for understanding the invention, be summarized as a core network CN coupled to a radio access network.

The radio access network of an LTE network mainly comprises network devices known as base stations (or "enhanced Node Bs") Ni, and at least one access gateway AG connected to the base stations Ni.

Each base station Ni is associated with at least one (logic) cell Ci covering a radio area (or coverage area) within which mobile (or cellular) radio communication terminals UE may establish (or follow) radio links, and within which this base station Ni may broadcast data, for example multimedia data (such as television programs, in particular).

In the example depicted, only three cells (C1-C3, i=1 to 3) have been depicted. However, the variable i may assume any non-zero value. Furthermore, in the example depicted, every base station Ni is assigned to a cell Ci. However, a base station may be assigned to multiple cells.

The access gateway AG is a centralized device that, in particular, handles the interface between the core network CN and the base stations Ni, in particular to provide them with the data to be broadcast. As depicted in FIG. 1 by way of a non-limiting example, the access gateway AG preferentially comprises a management module MG tasked with adapting one or more modulation and coding schemes to be applied to content data that must be broadcast over a point-to-multipoint physical channel (dedicated to a given service, here MBMS). Such schemes are known by the acronym MCS (for "Modulation and Coding Scheme").

It should be noted that this management module MG may be installed in, or coupled to, another type of network device besides an access gateway, such as a base station Ni or a broadcast server (here, an MBMS server) installed in the interface between the radio access network and the core network CN. Installing it in the access gateway AG is advantageous because the gateway is particularly in charge of the centralized management of data modulation and coding within the radio access network.

The core network CN comprises network devices that, in some cases, are connected, in particular, to the access gateway AG. Among these devices, there is at least one node handling the connection from the core network CN to a service network, which may be an IP network, that carries out the services made available to users of mobile terminals UE by the radio network's operator, and in particular data broadcast services.

Each base station Ni comprises an emission module EM and a reception module RM.

The emission module EM receives data to be broadcast using a selected modulation and coding scheme, and integrates them into the data frames that it broadcasts, in the form of radio signals by means of a dedicated carrier, over a forward channel (or "downlink") primarily dedicated to broadcasting. Hereinunder, only the broadcasting of content in a point-to-multipoint physical channel shall be considered, but the network may also be configured to distribute content within point-to-point physical channels.

The reception module RM is tasked with receiving the data frames transmitted by the mobile terminals UE over a backward channel (or "uplink"), and particularly the signaling data (such as acknowledgment reports ("Ack") or negative-acknowledgment reports ("Nack"), and to convey them, if need be, to the access gateway AG.

For example, the broadcast forward and backward channels may respectively correspond to distinct first and second frequency ranges (in FDD (pour "Frequency Division Duplex") transmission mode) or to distinct time slots or sets of time slots (for example, in TDD ("Time Division Duplex") transmission mode, which consists in using a single carrier divided into time slots selectively assigned to the forward and backward channels).

The mobile terminals UE are configured so as to receive the data frames that are broadcast over a point-to-multipoint physical channel by the radio access network (base stations Ni) over the forward channel, and to transmit signaling frames to the radio access network (base stations Ni) over the backward channel (for example, in HS-DPCCH control channels). Under certain conditions that will be described later, the (mobile) terminals UE of one or more cells may, for example, transmit these signaling frames simultaneously over the same physical channel (which makes it possible to optimize the radio spectrum, because in this case a multiplicity of (mobile) terminals UE use the same backward channel simultaneously). Each (mobile) module UE further comprises a measurement module MM tasked with obtaining paging information and taking radio measurements regarding the radio reception conditions in its own cell and/or in other, neighboring cells and/or from other radio access technologies besides the one used by the broadcast service.

In order to enable (mobile) terminals UE, which use the same content broadcast service (here, MBMS) in point-to-multipoint mode (via a physical channel) in at least one cell Ci of the radio network, to report at least some of the measurements that they took using their measurement module MM to the radio access network, the invention proposes to use at least a first or second processing device D.

In the example depicted in FIG. 1, each (mobile) terminal UE is equipped with its own first or second processing device D. However, in one variant, it may be envisioned that a second processing device D, installed in the radio access network, may act on behalf of multiple (mobile) terminals UE, in a centralized fashion.

A first or second inventive processing device D comprises a processing module PM that is at least tasked with generating status messages comprising data that is at least representative of at least some of the measurements that were taken by at least one (mobile) terminal UE, and with ordering that terminal to report these status messages to the radio network (and more precisely, to the base station Ni that controls the cell Ci in which it is (momentarily) located.

In what follows, it is assumed that the measurements, which are taken by the measurement module MM of a mobile terminal UE, are radio reception channel quality indicators (or CQIs). These indicators notably include signal-to-noise ratio ($Ec/N_o$), RSCP ("Received Signal Channel Power"—power received over the allocated physical channel), RSSI ("Received Signal Strength Indicator"—all of the energy of the signal received over the entire band), a preferred modulation and coding scheme (MCS), and the bit error rate (BER).

These measurements are, for example, related to the forward channel's traffic channel known as "MCH" (for "MBMS CHannel") or "DL-SCH" (for "DownLink-Shared CHannel"), or "BCH" ("Broadcast CHannel") or "SCH" ("Shared CHannel"). However, the measurements may relate to any other reference channel for a cell or group of cells.

It should be noted that the processing module PM may also be tasked with determining whether a measurement that was taken by a (mobile) terminal UE corresponds to a status found among a set of predefined statuses.

Each status is, for example, associated with a predefined range of radio reception channel quality indicator values (or its equivalent), as indicated below:

status E1 corresponds to values of CQI between CQI1 and CQI2 (CQI1≦CQI<CQI2), status E2 corresponds to values of CQI between CQI2 and CQI3 (CQI2≦CQI<CQI3), status E3 corresponds to values of CQI between CQI3 and CQI4 (CQI3≦CQI<CQI4), and status EN corresponds to values of CQI between CQIN and CQIN+1 (CQIN≦CQI<CQIN+1).

In the presence of this predefinition of the N statuses (with N≧2), whenever the processing module PM receives a measurement (here, a CQI), it determines among the various ranges of predefined values which one it belongs to, in order to determine the status that corresponds to this range of values.

The predefinitions of the N statuses and the occurrences of the portions of time and/or frequencies and/or codes used to report these N statuses are transmitted to the mobile terminals UE by the base stations Ni by means of service or control messages. It should be noted that these base stations Ni themselves receive these predefinitions of the N statuses of the network device that comprises the management module MG (here, the access gateway AG).

Every time that the processing module PM notices that a measurement corresponds to one of the predefined statuses, potentially during periodic analyses (separated by intervals of time that may be defined by the network), or upon the request of the access network, or during the occurrence of an event that may be defined by the network, it generates a status message which is specifically dedicated to that status, then orders the mobile terminal UE that took that measurement (or the set of mobile terminals UE on whose behalf it is acting and which took roughly the same measurement) to transmit this status message to the radio network, and more precisely to the base station Ni that controls the cell Ci in which it is/they are (momentarily) located. This status message is transmitted in a portion of the time/frequency/code domain which is specifically reserved for that status within a signaling frame, for at least one cell Ci within which the mobile terminal UE in question is located.

In other words, within a cell Ci (here, MBMS), all of the (mobile) terminals UE which determined a measurement corresponding to a single status message transmit the same status message within the same time/frequency/code portion. This is possible in a situation known here as "uplink-synchronous", wherein all of the (mobile) terminals UE are synchronized in transmission with respect to a time reference. This situation may be implemented in the presence of a second processing device D. It should be noted that a second processing device D may act on behalf of multiple (mobile) terminals UE. In such a case, it may be tasked with synchronizing the mobile terminals UE (for example, by regularly transmitting the current time reference to them). When a second processing device D is used for each (mobile) terminal UE, all of the second devices D must be synchronized with respect to the access network (and potentially to one another), such as by means of a regular transmission of the current time reference by the network, and each second device D is tasked with synchronizing the emission of its mobile terminal UE with respect to the time reference.

A situation may also arise in which the (mobile) terminals UE are not synchronized in transmission with respect to a time reference. Here, this situation is called "uplink asynchronous". This situation requires that the status messages are generated by a first device D and sent by its (mobile) terminal UE to the radio network over an authorized random access channel (for example, a RACH channel (for "Random Access CHannel")).

This authorized random access channel may, for example, be dedicated to reporting measurement statuses. This makes it different from the random access channel that is used by the (mobile) terminal UE to make its initial connection requests. In such a case, the status message comprises data configured in the form of a bit frame that represents at least one measurement taken by the mobile terminal UE.

In one variant, the processing module PM may order its first device D to multiplex (using time-, frequency-, or code-multiplexing) the random access channel used to carry the status messages (each containing data representative of a measurement status) with an initial connection request.

In such a case, i.e. when a single random access channel is used for one or more reporting measurements and connection requests, the processing module PM may incorporate data representative of the type of message into the (status or connection request) message which must be reported by the (mobile) terminal UE. Here, "type" refers to either a measurement report or a connection request (for example, to carry out a data transfer). Such data (or bits) thereby indicate to the network the reason for which the message is being sent over the random access channel.

It should be noted that a terminal UE often switches from a synchronous situation to an asynchronous one because before establishing a first connection, its transmission window is not synchronized with respect to the network. When a connection is established, the time advance of its transmission window is adjusted by the network, which enables the terminal UE to maintain its synchronous situation. After a certain period of inactivity, the network stops adjusting the time advance, and the terminal UE re-enters an asynchronous situation. This alternation between asynchronous and synchronous situations justifies the need to provide a procedure for each one. It will therefore be understood that an inventive device D may potentially behave as a first device or as a second device, as is needed. However, it may also be configured to define solely a first device or solely a second device.

For example, the access gateway AG comprises a signaling module SM tasked with reporting to the mobile terminals UE which portions of the time/frequency/code domain are reserved for status messages within the signaling frames on the backward channel. This signaling may, for example, occur over the control channel known as "MCCH" (for "MBMS Control CHannel"—as with an MBMS broadcast service) or "BCCH" (for "Broadcast Control CHannel"—in general). The time/frequency/code portions reserved for status messages are predefined by the control plan (here, MBMS).

Here, the term "portion of the time/frequency/code domain" refers to either a time slot or to a frequency range (or frequency band), or to a specific code.

When time slots are reserved, each status message corresponds to a sub-frame of a signaling frame on the backward channel (or uplink). In this situation, whenever a processing module PM has generated a status message, it orders the mobile terminal UE in question to time-multiplex this status message within the sub-frame which is dedicated to that status within a signaling frame. As depicted in FIG. 2, this time-multiplexing is ensured by the (mobile) terminal UE by means of a multiplexing module MX.

When frequency ranges are reserved, each status message corresponds to a sub-frame of a signaling frame on the backward channel (or uplink). In this situation, whenever a processing module PM has generated a status message, it orders the mobile terminal UE in question to frequency-multiplex this status message within the subcarrier which is dedicated to that status within a signaling frame. As depicted in FIG. 2, this frequency-multiplexing is ensured by the (mobile) terminal UE by means of a multiplexing module MX.

This second situation is schematically depicted in FIG. 3 in the uplink-synchronous situation, and in FIG. 4 in the uplink-asynchronous situation. More precisely, the time/frequency/code domain (here, simply the time/frequency domain) is broken down along the time axis and the frequency axis. Each elementary radio resource unit of a cell Ci corresponds to a frequency band FB used by at least one mobile terminal UE to transmit a signaling frame over the backward channel.

Each signaling frame is subdivided into sub-frames TT, each made up of a portion dedicated to transmitting signaling (and control) data and bounded by two pilots. As a reminder, a pilot is a sequence of learning bits used by the receiver (here, the radio network) in order to detect a channel (by means of its distortion).

In the example depicted in FIG. 3, the leftmost elementary unit of radio resources is used only by a first mobile terminal UE1, the next elementary unit of radio resources is alternately used by a second mobile terminal UE2 and the first mobile terminal UE1, the next elementary unit of radio resources is alternately used by a third mobile terminal UE3 for transmitting determined states and by a fifth mobile terminal UE5, and the next elementary unit of radio resources (the rightmost) is used by a fourth mobile terminal UE4 and a sixth mobile terminal UE6.

In this example, five statuses E1 to E5 (N=5) have been predefined. Consequently, the second sub-frame TT of the signaling frame associated with the third elementary unit of radio resources, is subdivided into five sub-carriers respectively associated with the five statuses E1 to E5.

In the synchronous situation on the uplink, in order for the base stations Ni to be able to decode the status messages transmitted, all of the (mobile) terminals UE with the same status may use the same pilot or preamble (for example, in OFDM or LTE). The use of a single pilot (or preamble) is less costly in implementation and when managing radio resources. The use of multiple pilots (or preambles) (for example, one for each terminal UE) requires that the access network also detect multiple pilots (or preambles).

What distinguishes the example depicted in FIG. 4 from the one depicted in FIG. 3 is essentially that the status messages are carried over a random access channel, which is time-multiplexed (but it could also be frequency- or code-multiplexed) with the random access channel that is used by the (mobile) terminal UE to make a connection request (by means of "access signaling"). Consequently, outside of this essential difference, everything stated above in reference to FIG. 3 applies to FIG. 4.

In the uplink-asynchronous situation, in order for the base stations Ni to be able to decode the status messages transmitted, all of the (mobile) terminals UE in a single status may use the same pilot (or preamble). The access network's receiver may advantageously draw upon known capture methods on random access channels, such as RACH (in GSM, GPRS, UMTS, or LTE).

It should be noted that for a CDMA radio network, each predefined status is associated with a particular code. Generally speaking, the spectrum of elementary resources may be shared in three dimensions (time, frequency, code), which respectively correspond to TDMA, FDMA, and CDMA networks, and each status is associated with one occurrence of these elementary resources.

Furthermore, it should be noted that as the statuses are transmitted at predefined moments (periodically in the synchronous situation on the uplink), the processing module PM does not necessarily analyze every measurement delivered by the measurement module of a (mobile) terminal UE. Consequently, the processing module PM may potentially ensure a measurement filtering function, so as to obtain a temporal average (for example, in this average a filter may grant more weight to the last values measured).

It should also be noted that a (mobile) terminal UE is not required to systematically transmit its status message in each time/frequency/code portion reserved for that purpose. However, in every time/frequency/code portion reserved for the transmission of status message(s), a (mobile) terminal UE can only transmit one status message.

As is schematically depicted in FIG. 2, an inventive (mobile) terminal UE may potentially comprise a pre-multiplexing module PMM tasked with multiplexing (whenever possible) the status message that was generated by the processing device PM of a second device D with a potential negative-acknowledgment report (or "Neck") or with a potential acknowledgment report (or "Ack") which must be transmitted to the radio network, before it is frequency- or time-multiplexed by the multiplexing module MX. As a reminder, a (mobile) terminal UE transmits a Nack report to the radio network whenever it has not received a block of data.

The pre-multiplexing module PMM receives Nack or Ack reports from the control module of the (mobile) terminal UE.

For example, the pre-multiplexing module PMM multiplexes a status message generated by the second processing device D with a Nack or Ack report by means of a QPSK modulation. It is then configured in the form of a QPSK modulator comprising two input channels, called I (for "in-phase") and Q (for "quadrature") which respectively receive status messages and Nack or Ack reports. For example, the I channel receives the status messages, while the Q channel receives the Nack or Ack reports. However, the reverse is also possible.

An inventive (mobile) terminal UE may potentially spread out the signaling frames which contain the status messages by means of a scrambling code which is specific to itself. Each scrambling code used by a (mobile) terminal UE may, for example, be derived from a communication identifier of that radio terminal (for example, the IMSI), and potentially from an identifier of the data broadcast service.

In one variant, the scrambling codes used by the various (mobile) terminals UE may possess properties of orthogonality, which make it possible to distinguish between the spread-apart (by scrambling) signaling frames that they respectively transmit.

Whenever a base station Ni receives a signaling frame containing one or more status messages, it extracts every status messages in order to transmit it to the management module MG, which here is installed in the access gateway AG.

In particular, whenever the transmission is carried out in OFDM over a single physical channel (uplink-synchronous situation), the base station Ni may receive the same status message from multiple (mobile) terminals UE, if they transmit within the same time window, preferentially one with a restricted span. This principle also applies to "SFN" (for "Single Frequency Network") radio networks. As a reminder, SFN networks use the same carrier for multiple emitters, with very accurate synchronization between these emitters so as to enable the receiver to combine the frames.

The management module MG is tasked with adapting the modulation and coding scheme to be applied to the data to be broadcast in point-to-multipoint mode over a physical channel of the forward channel, depending on the status messages received. With the invention, this adaptation now is carried out based on actual (or real) radio propagation conditions, over links established between the radio network and (mobile) terminals UE (which are recipients of the data to be broadcast).

As a reminder, the adapting the scheme(s) is used to adapt the reception and/or transmission parts of the (mobile) terminals' UE communication modules, and potentially the reception and/or transmission channels of the radio access network.

The statuses designated by the status messages received may be used in different ways. For example, the management module MG may determine, among the statuses, received, which one is best (or respectively, worst), then it adapts at least one of the data modulation and coding schemes (for which it is responsible) depending on that best (or respectively, worst) status. It should be noted that a single modulation and coding scheme (MCS) may be adapted at a given moment for a given cell and for a given physical channel.

In one variant, the management module MG may determine the average value of the statuses designated by the status messages received, then it adapts at least one of the data modulation and coding schemes (for which it is responsible) depending on that average value. It should be noted that the management module MG may potentially begin by weighting each status designed by a received status message, in order to determine the weighted average of these statuses. Next, it adapts at least one of the data modulation and coding schemes (for which it is responsible) depending on that weighted average.

The weighting may, for example, be carried out depending on predefined weights associated with each of the predefined statuses. In one variant, the weighting may be carried out depending on a radio parameter, such as the respective powers of the signals containing the status messages, received by the radio access network.

In another variant, which pertains to situations in which the status messages are transmitted in frames spread out by means of scrambling codes specific to the (mobile) terminals UE, the management module MG may begin by determining the distribution within the cell (at least), from which the status messages originate, of the statuses which are represented by the status messages received. Next, it adapts at least one of the data modulation and coding schemes (for which it is responsible) depending on that distribution of statuses.

Likewise, when different preambles are used by the terminals UE (uplink-asynchronous situation), the status messages sent by these terminals UE may be decoded separately, even if they were sent at the same time on the same carriers, and the management module MG may begin by determining the distribution within the cell (at least) from which the status messages originate, of the statuses which are represented by the status messages received. Next, it adapts at least one of the data modulation and coding schemes (for which it is responsible) depending on that distribution of statuses.

Whenever the same preamble is used by the terminals UE over a random access channel (uplink-asynchronous situation), the time gap in receiving the status messages sent by the terminals UE makes it possible to decode and distinguish the different status messages. Thus, the management module MG may begin by determining the distribution within the cell (at least) from which the status messages originate, of the statuses which are represented by the status messages received. Next, it adapts at least one of the data modulation and coding schemes (for which it is responsible) depending on that distribution of statuses. On a random access channel, the network may advantageously draw upon a known capture method in order to tell apart the various status messages transmitted.

In yet another variant, which pertains to situations in which the status messages are transmitted in frames spread apart by means of scrambling codes possessing properties of orthogonality, the base station Ni detects and distinguishes the signals received (which contain status messages) due to the orthogonality properties of their respective scrambling codes. Next, it extracts the status messages in order to transmit them to the management module MG. This module then determines the distribution within the cell (at least) from which the status messages originate, of the statuses which are represented by the status messages received. Next, it adapts at least one of the data modulation and coding schemes (for which it is responsible) depending on that distribution of statuses.

The first or second inventive processing device D, and particularly its processing module PM, the management module MG, the signaling module SM, the multiplexing module MX, and if any, the pre-multiplexing module PMM may be constructed in the form of electronic circuits, software (or computing) modules, or a combination of circuits and software.

In the example embodiments described above, the radio access network of the broadcast network is purely terrestrial. However, the invention also applies to purely satellite-based networks, as well as to hybrid networks comprising a satellite radio access network and a terrestrial radio access network, at least one of them being adapted for broadcasting data in at least point-to-multipoint mode. It may thereby be envisioned that the broadcast forward channel is purely satellite-based (for example a satellite-adapted DVB-H channel) while the backward channel is purely terrestrial (for example UMTS), or vice versa.

The invention is not limited to the embodiments of the first or second processing device, radio communication terminal, and network device described above, which are given as an example; rather, it encompasses all variants that a person skilled in the art may envision within the framework of the claims below.

Thus, in the foregoing, an example embodiment was described in which each radio terminal has its own first or second processing device. However, the invention also applies to situations in which a processing device acts on behalf of multiple radio terminals.

The invention claimed is:

1. A processing device for at least one communication terminal capable both of receiving data broadcast by a radio communication network in point-to-multipoint mode over a physical broadcast channel and using an adaptable modulation and coding scheme, and of determining measurements representative of the radio conditions present in at least the cell in which the communication terminal is located, comprising a processing module configured to generate status messages each comprising data representative of the value of at least one measurement taken by said radio terminal and to order said radio terminal to transmit the status messages to said radio network over an authorized random access channel, for at least said cell in question;

wherein the communication terminal transmits a given status message, concurrently with at least one other communication terminal that has a common status at a given moment, using a common portion of a time/frequency/code domain reserved for the given status message.

2. The device according to claim 1, wherein said processing module is configured to order said radio terminal located within a cell to time-, frequency-, or code-multiplex the authorized random access channel used by said radio terminal in order to issue an initial connection request.

3. The device according to claim 2, wherein said processing module is configured, whenever a random access channel is used to report measurements and connection requests, to integrate into the status or connection request message that must be reported by the terminal, data representative of the type of said message, said type being chosen from among a measurement report and a connection request.

4. The device according to claim 2, wherein said processing module is configured to determine whether a measurement taken by said radio terminal corresponds to a status among a set of predefined statuses, and if so, to generate a status message dedicated to said determined status and to order said radio terminal to transmit the status message, over said authorized random access channel, to said radio network within the portion of the time/frequency/code domain that is reserved for that status message, for at least said cell in question.

5. The device according to claim 4, wherein said processing module is configured to order at least one radio terminal located within a cell to frequency-multiplex said generated status message within a dedicated sub-carrier.

6. The device according to claim 4, wherein said processing module is configured to order at least one radio terminal located within a cell to time-multiplex said generated status message within a dedicated sub-carrier.

7. The device according claim 1, wherein said measurements are radio reception channel quality indicators.

8. The device according to claim 7, wherein each status is associated with a predefined range of radio reception channel quality indicator values, and in that said processing module is configured to determine the interval of ranges to which a measurement belongs, so as to determine the status that corresponds to that range of values.

9. The processing device according to claim 1, wherein said authorized random access channel is dedicated to reporting measurements to said radio network, and differs from a random access channel used by said radio terminal to issue an initial connection request.

10. A processing device for at least one communication terminal capable both of receiving data broadcast by a radio communication network in point-to-multipoint mode over a physical broadcast channel and using an adaptable modulation and coding scheme, and of determining measurements representative of the radio conditions present in at least the cell in which the communication terminal is located, comprising a processing module configured i) to determine whether a measurement taken by at least one radio terminal corresponds to a status from among a set of predefined statuses, and ii), if the measurement corresponds to a status from among the set of predefined statuses, to generate a message dedicated to said determined status and order said radio terminal to transmit the status messages to said radio network in a portion of the time/frequency/code domain that is reserved for that status message within a signaling frame, for at least said cell in question;
wherein the communication terminal transmits a given status message, concurrently with at least one other communication terminal that has a common status at a given moment, using a common portion of a time/frequency/code domain reserved for the given status message.

11. The device according to claim 10, wherein said processing module is configured to order at least one radio terminal located within a cell to frequency-multiplex said generated status message within a dedicated sub-carrier inside said signaling frame.

12. The device according to claim 10, wherein said processing module is configured to order at least one radio terminal located within a cell to time-multiplex said generated status message within a sub-frame, dedicated to said determined status, inside said signaling frame.

13. The device according to claim 10, wherein said processing module is configured to order at least one radio terminal located within a cell to multiplex said status message generated with a potential negative-acknowledgment report or with a potential acknowledgment report.

14. The device according to claim 10, wherein said measurements are radio reception channel quality indicators.

15. The device according to claim 14, wherein each status is associated with a predefined range of radio reception channel quality indicator values, and in that said processing module is configured to determine the range of values to which a measurement belongs, so as to determine the status that corresponds to that range of values.

16. A radio communication terminal that receives data broadcast by a radio communication network in point-to-multipoint mode over a physical broadcast channel and using an adaptable modulation and coding scheme, and determines measurements representative of the radio conditions found in at least the cell in which the communication terminal is located, comprising a processing device configured to generate status messages each comprising at least one bit frame representative of the value of at least one measurement that it took in order to transmit the status message to said radio network over an authorized random access channel, for at least said cell in question;
wherein the radio communication terminal transmits the status message, concurrently with at least one other radio communication terminal that has a common status at a given moment, using a common portion of a time/frequency/code domain reserved for the status message.

17. The terminal according to claim 16, further comprising a measurement module configured to take measurements comprising radio reception channel quality indicators.

18. The terminal according to claim 17, wherein said measurements pertain to a channel comprising at least one of "MCH", "DL-SCH", "BCH" and "SCH".

19. The terminal according to claim 17, wherein each status is associated with a preset range of radio reception channel quality indicator values.

20. A radio communication terminal that receives data broadcast by a radio communication network in point-to-multipoint mode over a physical broadcast channel and using an adaptable modulation and coding scheme, and to determines measurements representative of the radio conditions found in at least the cell in which the communication terminal is located, comprising a processing device (D) configured i) to determine whether a measurement that the communication terminal took in order corresponds to a status from among a set of predefined statuses, and ii), if the measurement corresponds to a status from among the set of predefined statuses, to generate a message dedicated to said determined status in order to transmit this the status message to said radio network in a portion of the time/frequency/code range that is reserved for that status message within a signaling frame, for at least said cell in question;

wherein the radio communication terminal transmits the status message, concurrently with at least one other radio communication terminal that has a common status at a given moment, using a common portion of the time/frequency/code domain.

21. The terminal according to claim 20, further comprising a multiplexer configured to frequency-multiplex said generated status message within a dedicated sub-carrier inside said signaling frame.

22. The terminal according to claim 20, further comprising a multiplexer configured to time-multiplex said generated status message within a sub-frame, dedicated to said determined status, inside said signaling frame.

23. The terminal according to claim 20, further comprising a pre-multiplexer configured to multiplex said status message with a potential negative-acknowledgment report or with a potential acknowledgment report.

24. The terminal according to claim 23, wherein said pre-multiplexer is configured to multiplex said generated status message with a potential negative-acknowledgment report or with a potential acknowledgment report using QPSK modulation.

25. A network device for a radio communication network capable of broadcasting data within cells, in point-to-multipoint over a physical broadcast channel and in accordance with modulation and coding schemes that are adaptable based on said cells, said device comprising a management module configured to adapt the schemes depending on actual radio broadcast conditions present within said cells, wherein said management module is configured to adapt a scheme depending on the messages representative of the predefined statuses corresponding to measurements taken by radio communication terminals located within at least one cell, and transmitted by the radio terminals in portions of the time/frequency/code domain which are respectively reserved for said messages representative of the statuses within signaling frames on the backward channel, for at least said cell in question;
wherein radio terminals that have a common status at a given moment use the same portion of the time/frequency/code domain to transmit concurrently their common status.

26. The network device according to claim 25, further comprising a signaling module configured to notify the radio terminals of the portions of the time/frequency/code domain which are reserved for said status messages within frames of the backward channel.

27. The network device according to claim 25, wherein the network device may receive the same message, dedicated to a status, from multiple radio terminals within the same time window.

28. The network device according to claim 25, wherein said management module is configured, upon receiving status messages originating from at least one cell having an adaptable scheme, to determine which one represents the worst status, then to adapt the scheme of at least said cell depending on said determined worst status.

29. The network device according to claim 25, wherein said management module is configured, upon receiving status messages originating from at least one cell having an adaptable scheme, to determine which one represents the best status, then to adapt the scheme of at least said cell depending on said determined best status.

30. The network device according to claim 25, wherein said management module is configured, upon receiving status messages originating from at least one cell having an adaptable scheme, to determine a weighted average of the statuses they represent, then to adapt the scheme of at least said cell depending on said weighted average.

31. The network device according to claim 30, wherein said management module is configured to determine said weighted average based on predefined weights associated with each of said predefined statuses.

32. The network device according to claim 30, wherein said management module is configured to determine said weighted average based on the respective powers of the signals containing said status messages, received by the radio access network of said radio communication network.

33. The network device according to claim 25, wherein in the presence of status messages transmitted in frames spread using scrambling codes specific to said radio terminals, said management module is configured, if status messages are received from at least one cell having an adaptable scheme, to determine a distribution within at least said cell of the statuses which are represented by said received status messages, to adapt the scheme of at least said cell based on said status distribution.

34. The network device according to claim 33, wherein each scrambling code used by a radio terminal is derived from a communication identifier of said radio terminal and from an identifier of the data broadcast service.

35. The network device according to claim 33, wherein said scrambling codes possess orthogonality properties for distinguishing between spread-out frames transmitted by different radio terminals.

36. The network device according to claim 25, wherein the network device forms part of a radio access network of said radio communication network.

37. The network device according to claim 25, wherein the network device constitutes an access gateway (AG) capable of enabling access to a core network (CN) of said radio communication network.

38. The network device according to claim 25, wherein the network device constitutes a base station (Ni) of said radio communication network.

39. The network device according to claim 25, wherein the network device constitutes a broadcast server of said radio communication network.

* * * * *